United States Patent
Bloom et al.

(10) Patent No.: US 9,798,845 B2
(45) Date of Patent: Oct. 24, 2017

(54) USER GREY CELL

(71) Applicant: Blue Pearl Software, Inc., Santa Clara, CA (US)

(72) Inventors: Scott Aron Bloom, Portland, OR (US); David E. Wallace, Hayward, CA (US)

(73) Assignee: Blue Pearl Software, Inc., Santa Clara, CA (US)

( * ) Notice: Subject to any disclaimer, the term of this patent is extended or adjusted under 35 U.S.C. 154(b) by 0 days.

(21) Appl. No.: 14/478,452

(22) Filed: Sep. 5, 2014

(65) Prior Publication Data
US 2015/0074623 A1    Mar. 12, 2015

Related U.S. Application Data

(60) Provisional application No. 61/874,680, filed on Sep. 6, 2013.

(51) Int. Cl.
   *G06F 9/45*    (2006.01)
   *G06F 17/50*   (2006.01)

(52) U.S. Cl.
   CPC ...... *G06F 17/5054* (2013.01); *G06F 17/5045* (2013.01); *G06F 2217/84* (2013.01)

(58) Field of Classification Search
   USPC ....................................................... 716/103
   See application file for complete search history.

(56) References Cited

U.S. PATENT DOCUMENTS

| | | | |
|---|---|---|---|
| 5,740,347 A | * | 4/1998 | Avidan ................ G06F 17/5031 714/33 |
| 6,158,022 A | | 12/2000 | Avidan |
| 7,392,498 B1 | | 6/2008 | Srinivasan et al. |

(Continued)

OTHER PUBLICATIONS

International Search Report for International Application No. PCT/US2014/054260 dated Dec. 16, 2014.

(Continued)

*Primary Examiner* — Eric Lee
(74) *Attorney, Agent, or Firm* — K&L Gates LLP

(57) ABSTRACT

In various embodiments, a user grey cell is disclosed. The user grey cell comprises a simplified logical implementation of a black box cell identified in a software and/or hardware design. The internal functionality of the black box cell is undefined, hidden, or encrypted, and thus is not available for timing analysis. The user grey cell for the black box cell provides sufficient clocking and register information to allow for accurate CDC, false path, and multi-cycle path analysis, and provides a way for designers to locate and repair clock domain crossing violations before the design is implemented in hardware. In various embodiments, a method for user grey cell analysis is disclosed. The method comprises identifying one or more black box cells in a user design. The method further comprises determining which of the input and/or output pins of each of the black box cells are in use by the user design. The method further comprises selecting a user grey cell for one or more of the black box cells, wherein a user grey cell comprises a simplified logic implementation for the black box cell, sufficient to perform CDC, false path, and multi-cycle path analysis. The selected user grey cells may be used in place of the black box cells for CDC, false path, and multi-cycle path analysis.

22 Claims, 10 Drawing Sheets

(56) References Cited

U.S. PATENT DOCUMENTS

| | | | |
|---|---|---|---|
| 8,122,413 B2 * | 2/2012 | Hom et al. | 716/116 |
| 8,239,798 B1 * | 8/2012 | Goyal et al. | 716/113 |
| 8,661,383 B1 * | 2/2014 | Dobkin | G06F 17/5081 |
| | | | 716/102 |
| 2003/0120474 A1 | 6/2003 | Moon et al. | |
| 2003/0196182 A1 | 10/2003 | Hahn | |
| 2008/0028347 A1 | 1/2008 | Hiraoglu et al. | |

OTHER PUBLICATIONS

Written Opinion of the International Searching Authority for International Application No. PCT/US2014/054260 dated Dec. 16, 2014.
International Preliminary Report on Patentability for International Application No. PCT/US14/054260 dated Mar. 8, 2016.

\* cited by examiner

USER GREY CELL

CROSS-REFERENCES TO RELATED APPLICATIONS

The present application claims the benefit, under 35 U.S.C. §119(e), of U.S. Provisional Application Ser. No. 61/874,680 filed Sep. 6, 2013, the disclosure of which is incorporated herein by reference in its entirety.

BACKGROUND

Black box design of software and/or hardware systems has become common in application-specific integrated circuit (ASIC) design, field programmable gate array (FPGA) design, and other digital and/or mixed-signal systems. Black box design involves selecting predefined elements for inclusion in a design without the need to see or understand the workings of the selected element. The input ports and output ports of a block box cell are defined, and the outputs for given inputs are clearly documented. A user provides inputs to the block-box cell and receives outputs from the black box cell without needing to understand or edit the internal components of the black box cell. Black box cells may be defined by a user library or provided by software and/or hardware vendors.

Black box cells, however, present a problem in timing analysis, including clock domain crossing (CDC), false path, and multi-cycle path analysis. In modern chip design it is not uncommon for a design to use multiple clocks, possibly driven at different frequencies and/or asynchronous to each other. A clock domain crossing occurs whenever data is transferred from a flop driven by one clock to a flop driven by another clock. If the two clocks in this scenario have not been synchronized, then the input signal to the second flop may not be stable when it is sampled, a situation called metastability. A false path occurs when a section of logic is not exercised during normal operation. The false path may be an error, or may exist for some other reason, in which case it can be ignored during timing analysis. A multi-cycle path is a timing path that is designed to take more than one clock cycle for data to propagate along the path.

Electronic design automation (EDA) software tools are capable of analyzing a design for clock domain crossings, and alerting the user if a clock domain crossing has occurred between two clock domains that are not synchronized. Black box cells, however, do not provide information about their internal operation; therefore, timing analysis tools are unable to determine which outputs from the black box are driven by which input clocks. Timing analysis tools thus typically leave black box cells out of the analysis. Black box cells are not immune from clock domain crossing issues, and thus what is needed are systems and methods for including black box cells in timing analysis.

SUMMARY

In various embodiments, a computing device is disclosed. In various embodiments, the computing device can be configured for generating user grey cells is disclosed. The computing device comprises a processor and a non-transitory computer-readable medium configured to store computer program instructions that, when executed by the processor, are operable to cause the processor to select a black box cell for inclusion in a digital hardware design, wherein the black box cell comprises one or more pins. The processor is further operable to identify a subset of one or more pins of the black box that are used by the digital hardware design. The processor is further operable to generate a user grey cell for the black box cell, wherein the user grey cell comprises a simplified logic implementation of the digital hardware design for each of the subset of pins used by the digital hardware design.

In various embodiments a computing device is disclosed. In various embodiments the computing device can be configured for grey cell analysis. The computing device comprises a process and a non-transitory computer-readable medium coupled to the processor, the non-transitory computer-readable medium configured to store computer program instructions that, when executed by the processor, are operable to cause the processor to identify on or more black box cells in a digital hardware design, wherein each black box cell comprises one or more pins. The processor is further operable to determine a subset of one or more pins of each black box cell that is used by the digital hardware design. The processor is further operable to select a user grey cell for each black box cell, wherein each user grey cell comprises a simplified logic implementation for each of the subset of pins.

FIGURES

The features of the embodiments described herein are set forth with particularity in the appended claims. The embodiments, however, both as to organization and methods of operation may be better understood by reference to the following description, taken in conjunction with the accompanying drawings as follows:

DESCRIPTION

Reference will now be made in detail to several embodiments, including embodiments showing example implementations of user grey cells. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

In various embodiments, a user grey cell is disclosed. The user grey cell comprises a simplified logical implementation of a black box cell identified in a software and/or hardware design. The internal functionality of the black box cell is undefined, hidden, or encrypted, and thus is not available for timing analysis. The user grey cell for the black box cell provides sufficient clocking and register information to enable accurate timing analysis, and provides a way for designers to locate and repair clock domain crossing violations before the design is implemented in hardware.

In various embodiments, a method for user grey cell analysis is disclosed. The method comprises identifying one or more black box cells in a user design. The method further comprises determining which of the input and/or output pins of each of the black box cells are in use by the user design. The method further comprises selecting a user grey cell for one or more of the black box cells, wherein a user grey cell comprises a simplified logic implementation for the black box cell, sufficient to perform timing analysis. The selected user grey cells may be used in place of the black box cells for timing analysis.

Figure 1A:
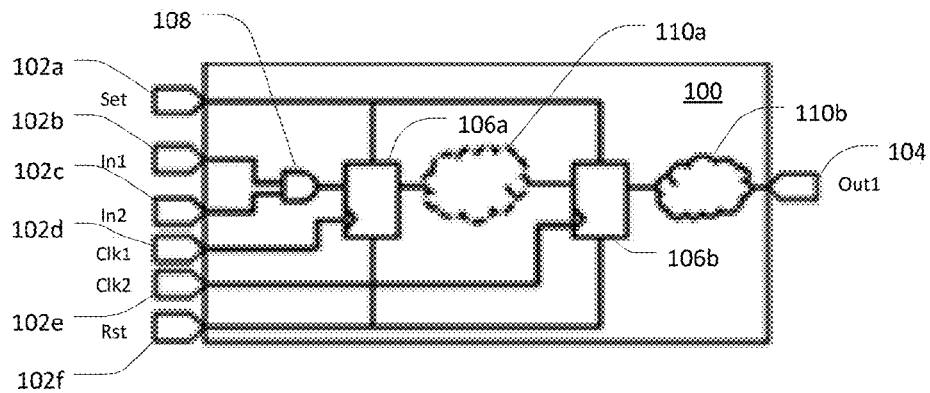
FIG. 1A illustrates an embodiment of a vendor proprietary cell.

FIG. 1A illustrates an embodiment of a vendor proprietary cell 100. The vendor proprietary cell 100 may have a number of input ports 102a-102f and one or more output ports 104. The internal functions of the vendor proprietary cell 100 may include combinatorial input logic 108 driven by the input ports, some number of flops 106a-106b, and logic 110a-110b driven by those flops 106a-106b. The output at the output port 104 for a given set of values at the input ports 102a-102f is clearly defined. In this specific example, a first flop 106a is driven by clock signal Clk1 102d and a second flop 106b is driven by clock signal Clk2 102e. If Clk1 102d and Clk2 102e are at asynchronous from each other, then the first flop 106a and the second flop 106b are in different clock domains.

Figure 1B:
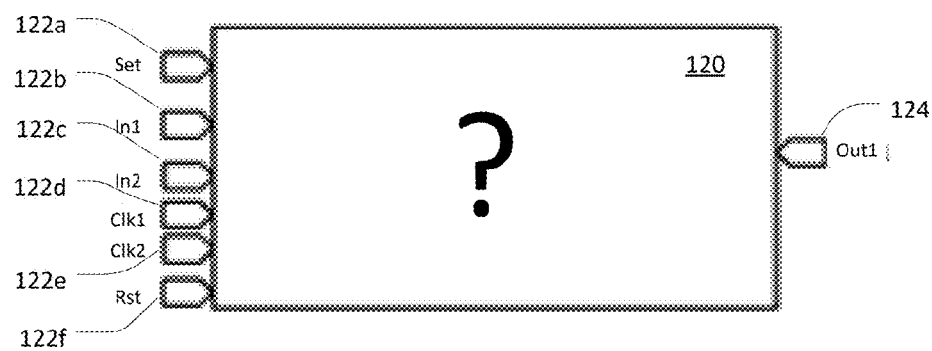
FIG. 1B illustrates an embodiment of a black box cell, representing what is visible to the user of the vendor proprietary cell.

FIG. 1B illustrates an embodiment of a black box cell 120, representing what is visible to the user of the vendor proprietary cell 100. Typically, the internal functionally illustrated in FIG. 1A is hidden from the user. The user's visibility of the functionality of the black box cell 120 is limited to the input ports 122a-122f, output port 124, and the expected outputs for given inputs. The user thus knows what the black box cell 120 does, but not how those tasks are accomplished. For functional simulations an encrypted model of the black box cell 120 may be provided, but for all other purposes the user can only treat the internals of a black box cell as unknown. A timing analysis tool similarly cannot see the internal functionality of the black box cell 120. Thus the timing analysis tool cannot determine which, if any, clock domains are present within the black box cell 120.

Figure 1C:
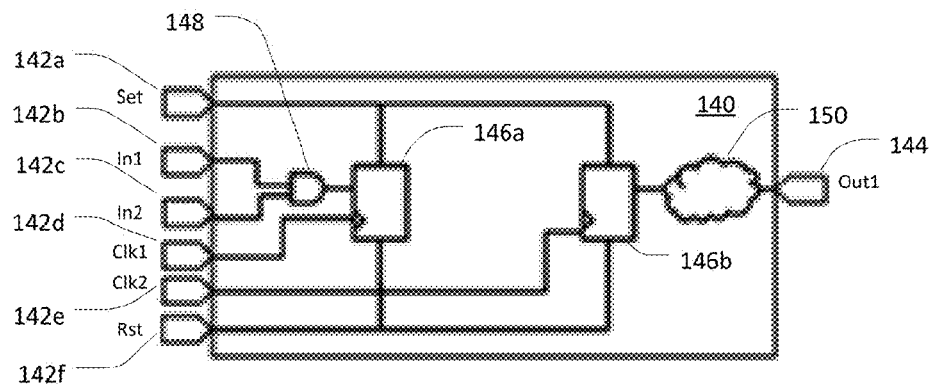
FIG. 1C illustrates an embodiment of a user grey cell for the black box cell of FIG. 1B.

FIG. 1C illustrates an embodiment of a user grey cell 140 for the black box cell 120. The user grey cell 140 has the same number and sizes of input ports 142a-142f and output port 144 as the black box cell 120. The user grey cell 140 does not have the same internal functionality as the black box cell 120. Instead, the user grey cell 140 recognizes that clock inputs Clk1 142d and Clk2 142e drive different clock domains within the user grey cell 140. The user grey cell 140 therefore instantiates a first flop 146a, driven by Clk1 142e, to represent the clock domain of Clk1 142e, and a second flop 146b, driven by Clk2 142d, to represent the clock domain of Clk2. The user grey cell 140 may further include input logic 148 to indicate that certain input ports 142b-142c are within the same clock domain. The user grey cell 140 may also instantiate output logic 150 to indicate the clock domain of an output port 144. Any unused ports are ignored. This simplified logic implementation is sufficient to perform timing analysis of a design that uses the user grey cell 140 in place of the black box cell 120. It is understood that the number of input clocks and clock domains illustrated is by way of example only, and not limitation. It is further understood that a black box cell may have any number of clocks and internal clock domains.

Figure 2A:
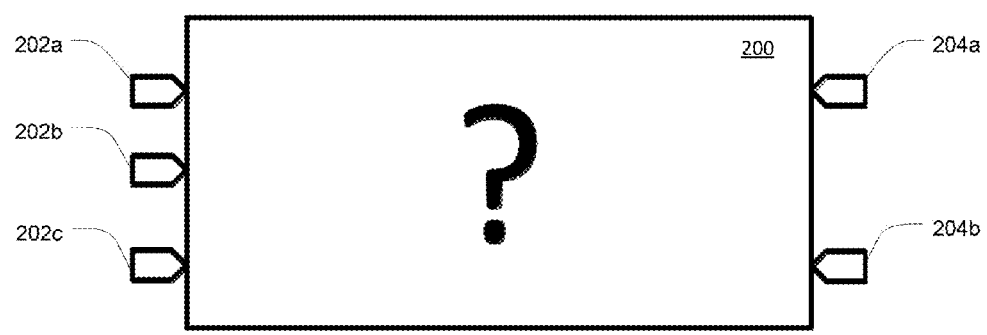
FIG. 2A illustrates an embodiment black box cell as viewed from a user design perspective.

FIG. 2A illustrates an embodiment of a black box cell 200 as viewed from a user design perspective. The black box cell 200 comprises five ports, three inputs 202a-202c and two outputs 204a, 204b. The user only sees the inputs 202a-202c and the outputs 204a, 204b without seeing the logic implemented within the black box cell 200.

Black box cells are useful to the user because the user can rely on the behavior of the cell without having to know how the cell operates. Black box cells are also useful to vendors because they allow vendors to release design elements to customers without revealing the potentially proprietary manner in which the cells operate. The black-box cells, however, do not provide information regarding internal clocks, clock domains, or data and/or control paths. Hence, black box cells are effectively invisible to CDC analysis. CDC analysis may comprise any number of methods, such as static and/or dynamic analysis. Static analysis examines the register transfer level (RTL) source code of the design and identifies clocks, clock domains, clock domain crossings, and clock synchronizers. CDC paths that are liable to introduce metastability or reconvergence issues are alerted to the user. Dynamic analysis uses the data from static analysis to ensure correct CDC functionality. In dynamic analysis, CDC protocol monitors check correct CDC functionality and ensure proper data transfer. Metastability injection logic is extended to each CDC path, which causes the tested design to act like a hardware implementation with random metastability effects. The data from the CDC checkers are then provided to the user to evaluate each CDC path in dynamic conditions.

For example, a Liberty or simplified Verilog model of the black box cell may be provided for purposes of CDC analysis. Liberty and simplified Verilog models, however, both require full port definitions of the black box cell. Full port definitions are time consuming and may be prohibitively complex for some black box cells. Even where only one port of a multi-port black box cell is used, Liberty and simplified Verilog models require full port definitions for CDC analysis.

Figure 2B:
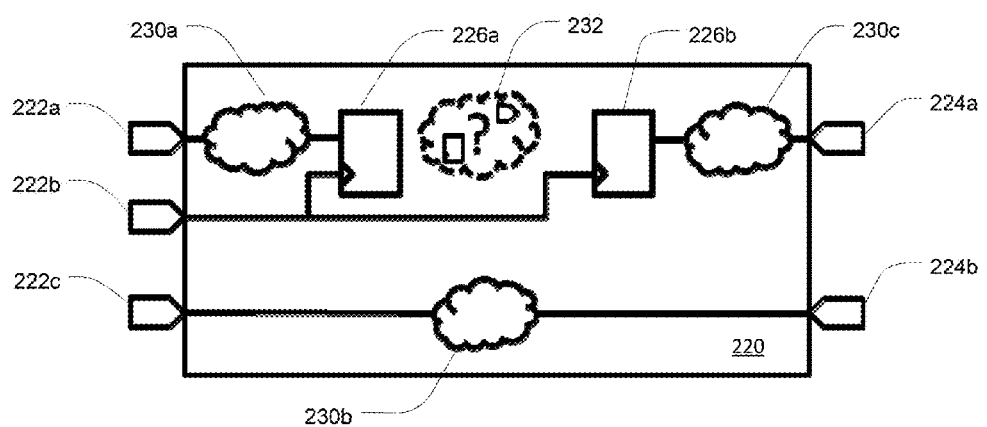
FIG. 2B illustrates an embodiment of a user grey cell.

FIG. 2B illustrates an embodiment of a user grey cell 220 for the black box cell 200 of FIG. 2A. A black box cell 200 is identified by an EDA software tool during RTL generation and a user grey cell 220 may be substituted for the black box cell 200. Returning to FIG. 2B, the user grey cell 220 comprises a partial or simplified implementation of the black box cell 200 sufficient to perform timing analysis. The user grey cell 220 comprises the same number and size of input pins 222a-222c and output pins 224a, 224b as the black box cell 200. In some embodiments, the user grey cell 220 models only the ports used by the user design. For example, in the illustrated embodiments, a third input port 222c and a second output port 224b are not used by the user design, thus the user grey cell 220 need only implement logic for the first and second inputs 222a, 222b and the first output 224a. The user grey cell 220 provides an RTL definition for the full interface of the black box cell 200 used by the user design. A user grey cell 220 may be implemented by an EDA software tool prior to a black box port algorithm being applied and/or prior to hardware testing.

In some embodiments, the user grey cell 220 comprises predefined logic for each of the input pins 222a-222c. For example, a first input pin 222a may have a modeled path comprising a first logic block 230a coupled to a first D flip-flop (DFF) 226a. A DFF 226a may be used as a simplified model for latching elements present within the black box cell 200, such as, for example, flip-flops, registers, and/or any other latching circuit element. The first logic block 230a and the DFF 226a are used to model the first input path 222a of the black box cell 200. The first logic block 230a can be used to determine false paths and multi-cycle paths that begin or end at the user grey cell 220. A second input pin 222b comprises a clock input 222b. The clock input 222b is coupled to the clock input of the first DFF 226a, such that, in some embodiments, the definition of the first input pin 222a may include the clock pin 222b. A third input 222c is coupled to a third path comprising a second logic block 230b. The logic blocks 230a, 230b may be defined by, for example, one or more equations associated with the user grey cell model.

The user grey cell 220 further comprises an output path model for each of the output pins 224a, 224b. A first output pin 204a is coupled to the output of a second DFF 226b. The first output path comprises a third logic block 230c between the output of the second DFF 230b and the first output pin 204a. The third logic block 230c can be used to determine false paths and multi-cycle paths that begin or end at the user grey cell 220. The clock input of the second DFF 226b is coupled to the clock input pin 222b such that, in some embodiments, the definition of the first output pin 224a may include the clock pin 222b. The second output 224b is coupled to the third input 222c through a second logic block 226b. In some embodiments, additional logic 232 may be present within the black box cell 200. The additional logic 232 is not modeled by the user grey cell 220, as the user grey cell 220 only needs to provide the DFFs 226a, 226b and logic blocks 230a, 230b, 230c for inclusion in the timing analysis.

User grey cells 220 may be defined for user defined black box cells, vendor provided black box cells, and/or third-party black box cells. User grey cells 220 may have identifiers to identify a user grey cell 220 as a base model, a vendor-specific model, or a custom model. An EDA software tool may provide predefined user grey cells 220 for commonly used or known black box cells. The EDA software tool may allow a user to extend or override predefined user grey cells to reflect user changes and/or design parameters.

In some embodiments, implementation of a user design in RTL will initiate loading of user grey cells 220 for each of the black box cells 200 (undefined cells) in the user design. The EDA software tool may compare the black box cell 200 name against a set of user grey cells and implement the user grey cell 220 that matches the black box cell 200 name. In some embodiments, a user grey cell 220 may be identified based on user provided and/or contextual information.

A user grey cell 220 may have multiple implementations based on, for example, the number of ports of the black box cell 200 used by the design. The interface of the user grey cell 220 in RTL may be determined by the context of the black box cell 200 in the user design. For example, a user grey cell 220 for a black box cell 200 having multiple ports may comprise an implementation for each combination of ports used. By implementing a user grey cell 220 based on contextual information, the user grey cell 220 may be used in multiple contexts without the need to define a new user grey cell 220 for each context. Once the interface of the user grey cell 220 is determined, a user grey cell may be substituted for the undefined black box cell 200. timing analysis can then be performed on the RTL implementation that includes the user grey cell 220.

In various embodiments, the user grey cell 220 comprises an input format suitable for implementation in EDA software tools. For example, in one embodiment, the input format comprises an Extensible Markup Language (XML) format. A user may modify predefined user grey cells and/or define new user grey cells using the XML format. If a user defines a user grey cell model already exists, the user defined grey cell model may override the preexisting model.

One example implementation of a user grey cell 220 is discussed below. Those skilled in the art will recognize that the user grey cell 220 implementation is provided only by way of example and not limitation. In one embodiment, an XML user grey cell implementation may have the following schema:

SynchCells: Cells
Cell: CellAttribute Pins
CellAttributes: modulename=string, archname=string—optional, synch_cell=boolean
Pins: input pin|output pin|inout pin|clk pin|reset pin|set pin
InputPin: PinName=string, lsb=number|parameter—optional, msb=number|parameter—optional, clkpin=string, rstpin=string—optional, setpin=string—optional, clkpin=string—optional, asynch=boolean—optional (default false), synchronizer=<synchronizer type>, equation=<equation string>
OutputPin: PinName=string, clkpin=string, lsb=number|parameter—optional, msb=number|parameter—optional, rstpin=string—optional, setpin=string—optional, equation=<equation string>—optional, asynch=Boolean—optional (default false)
InoutPin: PinName=string, inclkpin=string, lsb=number|parameter—optional, msb=number|parameter—optional, inrstpin=string—optional, outrstpin=string—optional, insetpin=string—optional, outsetpin=string—optional, inequation=<equation string>—optional, outequation=<equation string>, inAsynch=boolean—optional (default false), synchronizer=<synchronizer type>, outAsynch=boolean—optional (default false).
ClkPin: PinName=string, dir=input|output
ResetPin: name=string, ActiveHigh=boolean
SetPin: name=string, ActiveHigh=boolean The archname defines an architecture name for the user grey cell. If the archname attribute is set, only cells that match both the modulename and the archname will match the user grey cell. If the archname is not set, all cells with the same modulename will match the user grey cell. If the archname is not set, but the modulename already exists in the EDA software tool user grey cell library, a new user grey cell will only be used on a match of modulename and without an architecture.

In one embodiment, when an input pin is defined, a flip-flop, such as, for example, a D flip-flop (DFF), is inferred by the EDA software tool. The D input of the DFF is coupled to the input pin specified and the DFF clock input is coupled to the clkpin input specified. The output of the DFF is not connected when an input pin is defined. If the reset pin (rstpin) and the set pin (setpin) are specified, a D flip-flop with set and reset inputs (DFFRS) is defined. The D input of the DFFRS is coupled to the input pin. The clock input of the DFFRS is coupled to the clkpin. The set input of the DFFRS is coupled to the setpin and the reset input of the DFFRS is coupled to the rstpin. In some embodiments, a least significant bit (LSB) and a most significant bit (MSB) may be defined. If either a LSB or a MSB is defined, then both the LSB and MSB must be defined. An input bus will be generated when a LSB and MSB are defined and a wide DFF will be generated. If the LSB or MSB are a parameter, the parameter is determined at elaboration time, and the user-instantiated parameter value is used for the number. If any of the pins have been previously defined in the user model, and neither of the pins have a LSB/MSB pair, the input pin will be converted to the current instantiation. By converting the input pin, the user grey cell and user model may provide parameterized source model usage. In some embodiments, an optional asynch parameter is included to identify an asynchronous input pin. The input signal from an asynchronous input pin can be directly connect to other pins via combinational logic equations. If the asynch parameter is set, the model will not generate a DFF for the input pin identified as asynchronous. If the asynch option is not defined it is expected that clkpin is defined. The synchronizer types supported will vary based on production version of synchronizers available, as well as available software licenses. At a minimum, however, the basic double register synchronizer will be available. A synchronizer defined by the <synchronizer type> will be inserted at the input of the input pin. The optional equation creates logic before the DFF driver by the input pin.

In one embodiment, when an output pin is defined, a DFF is inferred with the output of the DFF coupled to the output pin. The input of the DFF is unconnected when an output pin is defined. If the output pin has been previously defined in the user model, the output pin will be attached and the direction of the pin changed to output. In some embodiments, if a conflict occurs in the size of the output pin between the previously defined output pin and the presently defined output pin, a fatal error may occur and the model may notify the user. If the rstpin and the setpin are defined, a DFFRS is inferred with the output of the DFFRS coupled to the output pin, the rstpin coupled to the reset input of the DFFRS, and the setpin coupled to the set input of the DFFRS. The input of the DFFRS is unconnected when an output pin is defined. The clock input of the DFF and/or DFFRS is coupled to the clkpin. An output clkpin represents a new clock domain. In some embodiments, clkpins, rstpins, and setpins are always scalar. If an optional equation is defined, the output pin will be driven by the logic defined by that equation. In some embodiments, an optional asynch parameter is included to identify an asynchronous output pin. If the asynch parameter is set, the model will not generate a DFF for the output pin identified as asynchronous.

In some embodiments, the black box cell 200 instantiates one or more the pins as "inout" pins. An inout pin may operate as an input pin or an output pin, depending on the given situation. The EDA software tool is configured to infer the direction of the inout pin based on the context of the black box cell 200 within the user design. For example, if an inout pin of a first black box cell is coupled to the output pin of a second black box cell, the inout pin of the first black box cell is inferred as an input pin. As another example, if the inout pin of a first black box cell is coupled to the input pin of a second black box cell, the inout pin of the first black box cell is inferred as an output pin. Although simplified embodiment of inout pins have been provided for illustration, those skilled in the art will recognize that additional contextual information may be utilized the EDA software tool to infer the direction of an inout pin of a black box cell.

Clock pins may be specified as input pins or output pins. Clock pins defined as output pins represent a new clock domain. Clock pins, reset pins, and set pins are always one bit.

In some embodiments, one or more equations are defined to model the logic of the black box cell 200. The one or more equations represent circuit elements between an input or output pin and a flip-flop coupled to the pin and/or between an input pin and an output pin. The signals for the inputs to the logic equation are connected either directly to the input pin defined for the user grey cell 220 or the output from a flip-flop (or register) created for the user grey cell 220. The internally generated nets or equations need not be accessible by the user. In some embodiments, the output from a Boolean equation will drive the input to a DFF or the output from a DFF. Equations may be defined in Backus Normal Form (Backus-Naur Form or BNF). One embodiment of a BNF for a user grey cell equation is presented below. The BNF embodiment is presented only as an example and is not intended to be limiting.

In one embodiment, a BNF equation may be defined as:

```
<expression> := <term>                    //precedence 1
    | <expression> "+" <term>
    | <expression> "|" <term>
<term> := <factor1> |                     //precedence 2
    <term> "&" <factor1>
    <term> " " <factor1>
    <term> " " <factor1>
<factor1> := "!" <factor> |               //precedence 3
    <factor>
<factor> := <constant> |
    <variable> |
    "(" <expression> ")"
<variable) := <inv_variable> | id
<inv_variable> := """ id |
    "id'"
<constant> := <digit>
<digit> := <digit> 0, 1...n
<id> := <alpha>,<digit>
<alpha> := a-z | A-Z, <alpha>
```

Examples of XML-defined user grey cells are shown below. Those skilled in the art will recognize that XML-defined user grey cells are provided only by way of example and not limitation.

The following example illustrates a user grey cell for a one-bit first-in-first-out (FIFO) black box element. The user grey cell may be defined as:

```xml
<UserGreyCell>
  <Cell ModuleName="CELL" SyncCell="yes">
    <InputPin PinName="DI" ClkPin="WRCLK" RstPin="RST">
    </InputPin>
    <OutputPin PinName="WRCOUNT" ClkPin="WRCLK" RstPin="RST"></OutputPin>
    <OutputPin PinName="DO" ClkPin="RDCLK" RstPin="RST">
    </OutputPin>
    <OutputPin PinName="RDCOUNT" ClkPin="RDCLK" RstPin="RST"></OutputPin>
    <ClkPin PinName="RDCLK" Dir="in"/>
    <ClkPin PinName="WRCLK" Dir=In"/>
  </Cell>
</UserGreyCell>
```

Figure 3A:
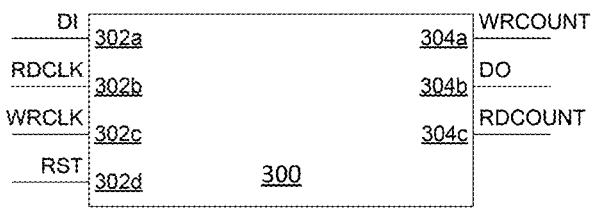
FIG. 3A illustrates a black box cell that may be represented by the one-bit FIFO element user grey cell illustrated by the XML example.
Figure 3B:
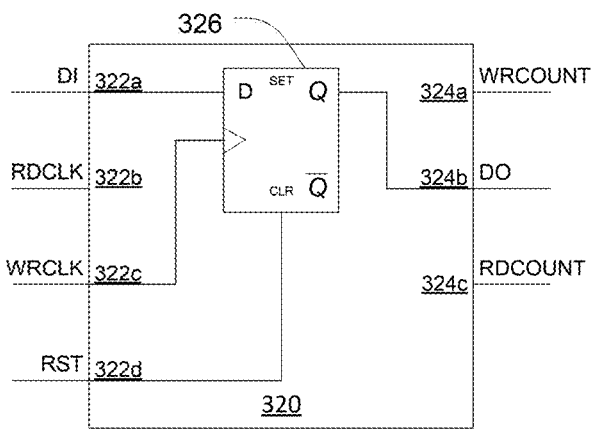
FIG. 3B illustrates an example implementation of a user grey cell for the black box cell of FIG. 3A.
Figure 3C:
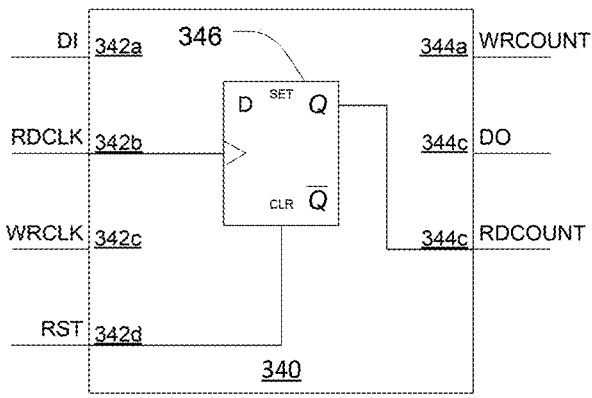
FIG. 3C illustrates an alternative example implementation of a user grey cell for the black box cell

FIG. 3A illustrates a black box cell 300 that may be represented by the one-bit FIFO element user grey cell illustrated above. The black box cell 300 has input ports 302a-302d and output ports 304a-304c as described by the XML description above. FIG. 3B illustrates an example implementation of a user grey cell 320 for the black box cell 300 of FIG. 3A. As illustrated in FIG. 3B, the user grey cell has the same number and size of input ports 322a-322d and output ports 324a-324c as the black box cell 300. The user grey cell 320 in this example recognizes that the DI 322a input is in the clock domain of the WRCLK 322c, and that the DI 322a input propagates to the DO 324b output; hence, the user grey cell 320 instances a DFF 326, with the DFF's 526 D input driven by DI 322a, the output connected to DO 324b, and the clock input connected to WRCLK 322c. FIG. 3C illustrates an alternative example implementation of a user grey cell 340 for the black box cell 300. The user grey cell 340 of this example also has the same number and size of input ports 342a-342d and output ports 344a-344c of the black box cell 300. In this example, a DFF 346 is instanced for the output ports RDCOUNT 344c, to indicate that the RDCOUNT 344c is in the clock domain driven by RDCLK 342b. It is understood that FIGS. 3B and 3C are illustrated separately for convenience and clarity. It is further understood that the DFFs 326, 346 illustrated in FIGS. 3B and 3C, as well as others as necessary, may be instanced within a single user grey cell.

The following example illustrates a user grey cell for a first-in-first-out (FIFO) black box cell element, described in XML. The user grey cell may be defined as:

```xml
<UserGreyCell>
  <Cell ModuleName="fifo_generator" SyncCell="yes"
    <InputPin PinName="din" ClkPin="wr_clk" RstPin="rst">
      <!--unsized and will match any size din input -->
    </InputPin>
    <InputPin PinName="wr_en" ClkPin="wr_clk" RstPin="rst"/>
    <OutputPin PinName="full" ClkPin="wr_clk" RstPin="rst"/>
    <OutputPin PinName="almost_full" ClkPin="wr_clk" RstPin="rst"/>
    <OutputPin PinName="prog_full" ClkPin="wr_clk" RstPin="rst"/>
    <OutputPin PinName="overflow" ClkPin="wr_clk" RstPin="rst"/>
    <OutputPin PinName="dout" MSB="384" LSB="0" ClkPin="rd_clk" RstPin="rst"/>
```

```xml
      <!--will only match a 384:0 dout>
    </OutputPin>
    <InputPin PinName="rd_en" ClkPin="rd_clk" RstPin="rst"/>
    <OutputPin PinName="empty" ClkPin="rd_clk" RstPin="rst"/>
    <OutputPin PinName="almost_empty" ClkPin="rd_clk" RstPin="rst"/>
    <OutputPin PinName="valid" ClkPin="rd_clk" RstPin="rst"/>
    <OutputPin PinName="prog_empty" ClkPin="rd_clk" RstPin="rst"/>
    <AsynchOutputPin PinName="comb" equation="(a&b)^(c+d)" />
    <ResetPin PinName="rst" ActiveHigh="0" />
    <ClkPin PinName="rd_clk" Dir="in" />
    <ClkPin PinName="wr_clk" Dir="in" />
    <ClkPin PinName="outclk" Dir="out" />
      <!-- Output clock, defines a new clock domain-->
    </ClkPin>
  </Cell>
</UserGreyCell>
```

Figures 4A, 4B:
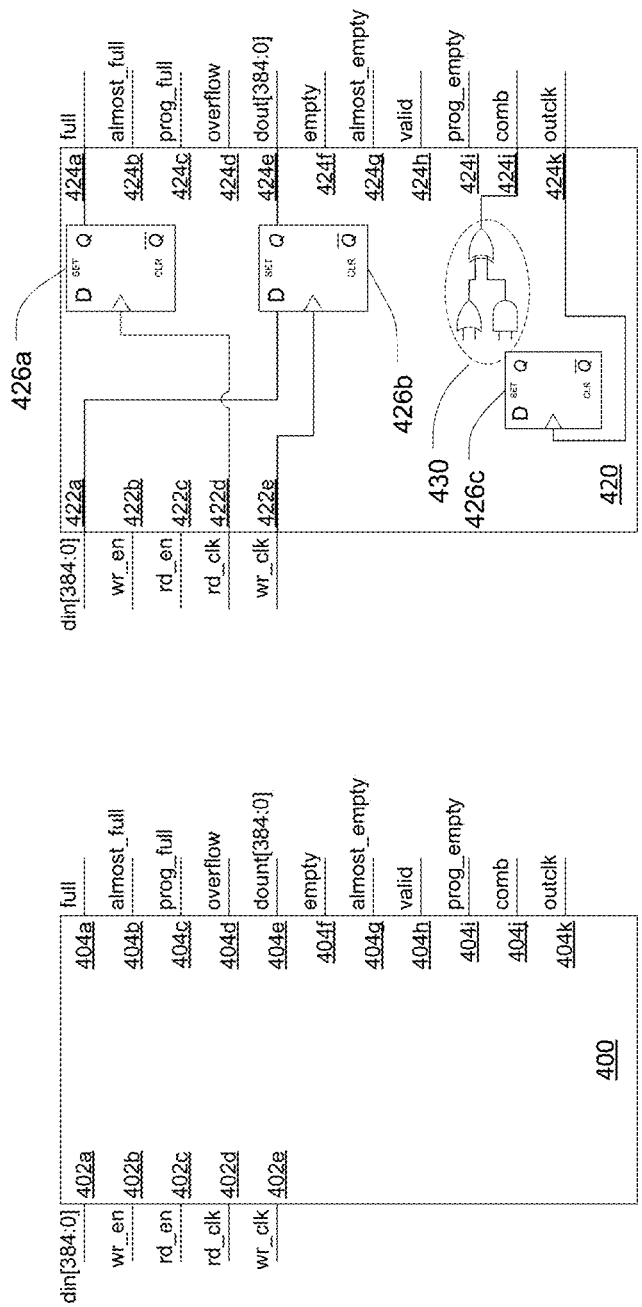
FIG. 4A illustrates a black box cell that may be represented by the FIFO element user grey cell illustrated by the XML example.
FIG. 4B illustrates an example implementation of a user grey cell for the black box cell illustrated in FIG. 4A.

FIG. 4A illustrates a black box cell 400 that may be represented by the FIFO element user grey cell illustrated above. The black box cell 400 has input ports 402a-402e and output ports 404a-404k as described by the XML description above. FIG. 4B illustrates an example implementation of a user grey cell 420 for the black box cell 400 illustrated in FIG. 4A. As illustrated in FIG. 4B, the user grey cell 420 has the same number and size of input ports 422a-422e and output ports 424a-424k as the black box cell 400. The user grey cell 420 further comprises a first DFF 426a that defines a first clock domain driven by the rd_clk 422d, here illustrated as the clock domain for the full 424a output port. The user grey cell 420 further comprises a second DFF 426b that illustrates a second clock domain driven by the wr_clk 422e, here illustrated as for the din 422a and dout 424e input and output. The user grey cell 420 further comprises a third DFF 426c for the clock domain defined by the output clock, outclk 424k. The user grey cell 420 also comprises output combination logic 430 for the comb 424j output port, as defined by the XML description above. The combinational logic 430 can be used to determine false paths and multi-cycle paths that being or end at the user grey cell 420. It is understood that the user grey cell 420 may comprise further DFFs, input logic, and output logic as necessary.

The following example illustrates a user grey cell for an alternate FIFO black box element, described in XML. The user grey cell may be defined as:

```xml
<UserGreyCell>
  <Cell ModuleName="fifo_xlx" SyncCell="yes"
    <InputPin PinName="D" ClkPin="WRCLK" RstPin="RST">
      <!--unsized and will match any size din input -->
    </InputPin>
    <InputPin PinName="RDEN" ClkPin="RDCLK" RstPin="RST" />
    <InputPin PinName="WREN" ClkPin="WRCLK" RstPin="RST" />
    <OutputPin PinName="ALMOSTEMPTY" ClkPin="RDCLK" RstPin="RST" />
    <OutputPin PinName="FULL" ClkPin="WRCLK" RstPin="RST" />
    <OutputPin PinName="ALMOSTFULL" ClkPin="wrclk" RstPin="rst"/>
```

```
          <OutputPin PinName="DO" MSB="7" LSB="0" ClkPin="RDCLK"
RstPin="RST"/>
              <!--will only match a 7:0 DO>
          </OutputPin>
          <OutputPin PinName="DO" ClkPin="RDCLK" RstPin="RST"/>
          <OutputPin PinName="EMPTY" ClkPin="RDCLK" RstPin="RST"/>
          <OutputPin PinName="empty" ClkPin="rd_clk" RstPin="rst"/>
          <OutputPin PinName="RDCOUNT" MSB="3" LSB="0" ClkPin="RDCLK"
RstPin="RST"/>
          <OutputPin PinName="RDERR" ClkPin="RDERR" RstPin="RST"/>
          <OutputPin PinName="WRCOUNT" MSB="3 LSB="0" ClkPin="WRCLK"
RstPin="RST"/>
          <ResetPin PinName="RST" ActiveHigh="0" />
          <ClkPin PinName="RDCLK" Dir="in" />
          <ClkPin PinName="WRCLK" Dir="in" />
     </Cell>
</UserGreyCell>
```

Figures 5A, 5B, 5C:
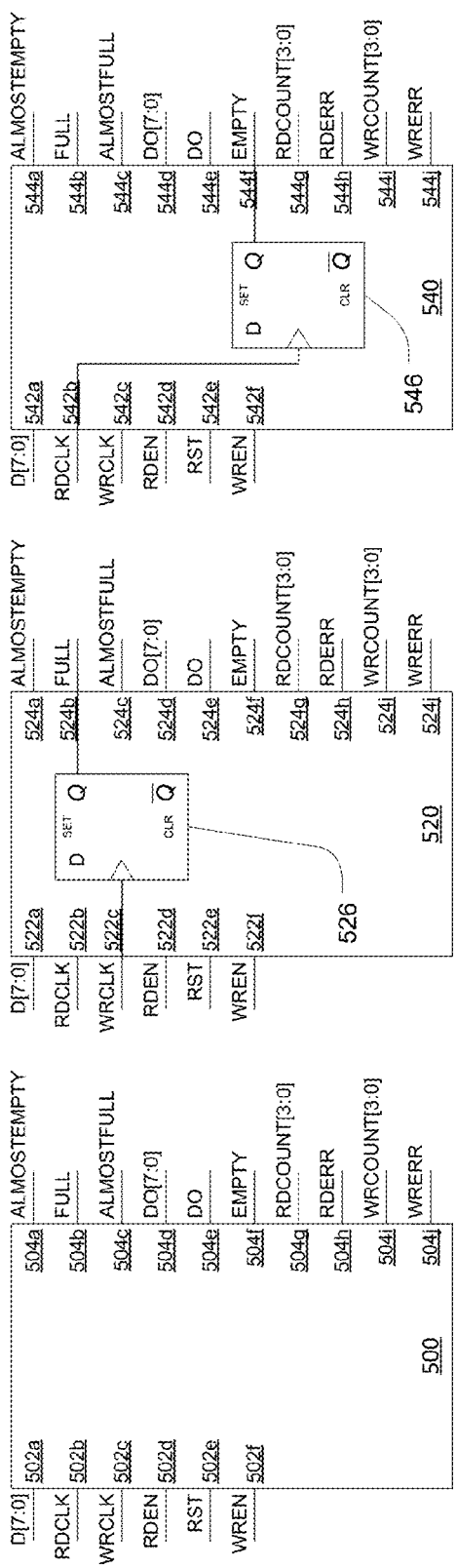
FIG. 5A illustrates a black box cell that may be represented by the FIFO element user grey cell illustrated by the XML example.
FIG. 5B illustrates an example implementation of a user grey cell for the black box cell of FIG. 5A.
FIG. 5C illustrates an alternative example implementation of a user grey cell for the black box cell.

FIG. 5A illustrates a black box cell 500 that may be represented by the FIFO element user grey cell illustrated above. The black box cell 500 has the input ports 502a-502f and output ports 504a-504j as described by the XML above. FIG. 5B illustrates an example implementation of a user grey cell 520 for the black box cell 500 of FIG. 5A. As illustrated in FIG. 5B, the user grey cell 520 has the same number and size of input ports 522a-522f and output ports 524a-524j as the black box cell 500. The user grey cell 520 in this example recognizes that the FULL 524b output is in the clock domain driven by the WRCLK 522c; hence, the user grey cell 520 instances a DFF 526, with the output of the DFF 526 connected to the FULL 524b output and the clock connected to the WRCLK 522c input. FIG. 5C illustrates an alternative example implementation of a user grey cell 540 for the black box cell 500. The user grey cell 540 of this example also has the same number and size of input ports 542a-542f and output ports 544a-544j as the black box cell 500. In this example, a DFF 546 is instanced with the output connected to the EMPTY 544f output port and the clock connected to RDCLK 542b to indicate that the EMPTY 544f is in the RDCLK 542b clock domain. It is understood that FIGS. 5B and 5C are illustrated separately for convenience and clarity. It is further understood that the DFFs 526, 546 illustrated in FIGS. 5B and 5c, as well as others are necessary, maybe instanced within a single user grey cell.

Figure 6A:
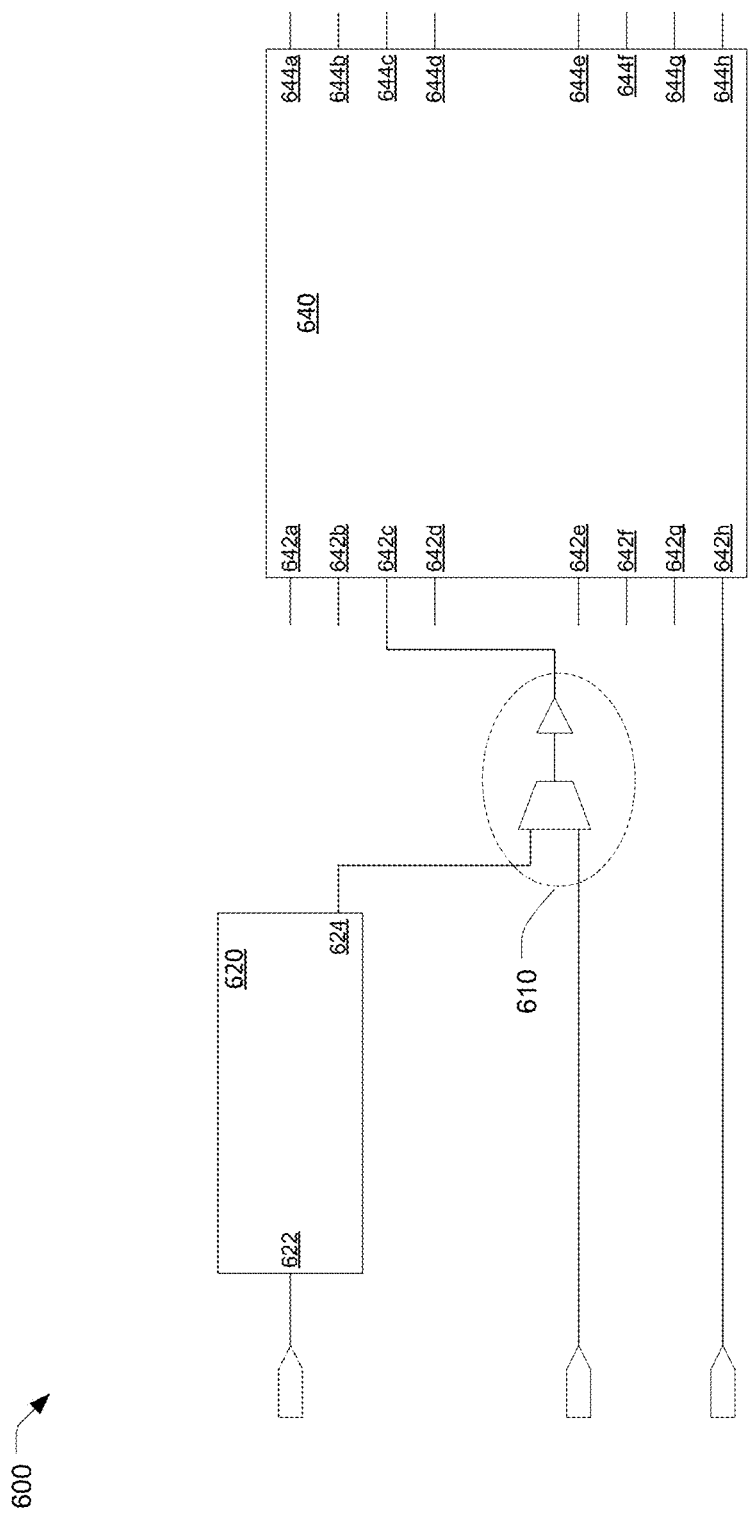
FIG. 6A illustrates an example of a user design comprising a first black box cell and a second black box cell.
Figure 6B:
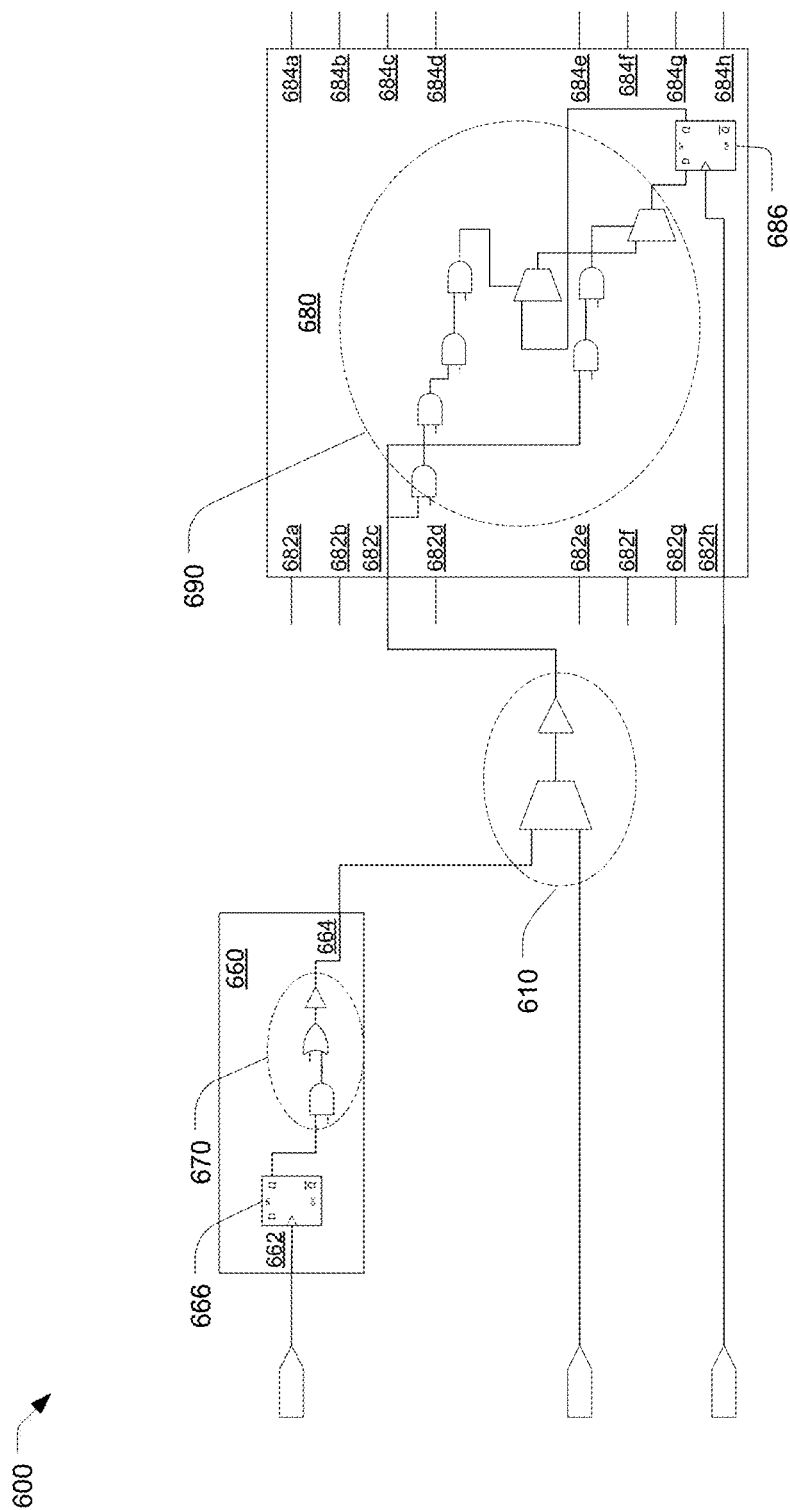
FIG. 6B illustrates the user design of FIG. 6A with user grey cells modeling the black box cells.

FIGS. 6A and 6B illustrate grey cell analysis of a user design and selection of user grey cells for timing analysis. FIG. 6A illustrates an example of a user design 600 wherein an EDA tool has identified a first black box cell 620 and a second black box cell 640. The first black box cell 620 comprises a first input 622 and a first output 624. The second block-box cell 640 comprises a plurality of inputs 642a-642h and outputs 644a-644h. The first black box 620 is coupled to the second black box 640 through a plurality of circuit elements 610. The plurality of circuit elements 610 are user defined. While the second black box cell 640 comprises a plurality of inputs 642a-642h, in the illustrated example the EDA tool has determined that the user design 600 uses two inputs 642c, 642h. timing analysis only requires ports that are in use by the design, and therefore the EDA tool will select a first user grey cell 660 that models at least the first input port 622 and the first output port 624, and a second user grey cell 680 that models at least the connected ports of the second black box cell 640.

FIG. 6B illustrates the user design 600 of FIG. 6A with user grey cells 660, 680 modeling the black box cells 620, 640. As illustrated in FIG. 6B, a first user grey cell 660 models the first black box cell 620, and a second user grey cell 680 models the second black box cell 640. The first and second user grey cells 660, 680 are implemented according to one or more predefined user grey cell definitions. In one embodiment, the first and second user grey cells 660, 680 comprise simplified models of the respective first and second black box cells 620, 640 sufficient to perform timing analysis. The first user grey cell 660 has a first input port 662 and first output port 664 of the same number and size as the first black box cell 620. The first output 664 of the first user grey cell 660 is defined by an equation in the user grey cell model, which is implemented with a plurality of circuit elements 670. The circuit elements 670 can be used to determine false paths and multi-cycle paths that begin or end at the first user grey cell 660. The first output 664 is in the clock domain of the clock driven into the first input port 662, and thus the user grey cell includes a first flip-flop 666, where the first flip-flop's 666 clock input is connected to the first input port 662 and the first flip-flop 666 drives the circuit elements 670. The first flip-flop 666 and the plurality of circuit elements 670 are sufficient to perform timing analysis, including CDC, false path, and multi-cycle path analysis of the first black box cell 620. The first user grey cell 660 is coupled to the second user grey cell 680 through a plurality of circuit elements 610. The plurality of circuit elements 610 are defined by the user in the user design 600.

The second user grey cell 680 comprises a plurality of input ports 682a-682h and output ports 684a-684h that are of the same number and size as that of the second black box cell 640. Although the second black box cell 620 comprises a plurality of inputs ports 682a-682h and a plurality of output ports 684a-684h, the user design 600 uses only two inputs, a second input port 682c and a clock input 682h. Therefore, the second user grey cell 680 need only model the input ports that are in use by the user design 600. The second input port 682c is defined by the second user grey cell 680 as having a logic equation, which is modeled by a plurality of circuit elements 690, driven by the second input port 682c. The circuit elements 690 can be used to determine false paths and multi-cycle paths that begin or end at the user grey cell 680. The plurality of circuit elements 690 are connected to the input of a second flip-flop 686. The clock input of the second flip-flop 686 is connected to the clock input 682h, to indicate that the second input 682c is in the clock domain of that clock signal. The user design 600 comprising a first user grey cell model 660 and a second user grey cell model 680 comprises sufficient information to perform timing analysis, including CDC, false path, and multi-cycle path analysis of the user design 600.

In some embodiments, a vendor-provided EDA software tool may comprise a user grey cell selection engine. The user grey cell selection engine may comprise a set of predefined user grey cell models. The predefined user grey cell models may comprise grey cell models for black box cells provided by hardware vendors, software vendors, or third-party vendors. A user may access an option, such as, for example, a "Use Vendor Library Cells" option in the EDA software tool to access predefined models for black box cells in the vendor library. When a user sets a "Use Vendor Library Cells" option, the vendor-provided EDA software tool loads the synthesizable vendor black box cells, the vendor-based clock definition cells, and vendor-specific grey cell models for each of the vendor black box cells.

A user may add a vendor-provided black box cell to a user design within the EDA software tool. When a user attempts to synthesize and test the design, for example, in RTL, the black box cell will be undefined in the RTL. The EDA software tool automatically loads a user grey cell associated with the undefined black box cell in the user design. The attributes of the user grey cell are determined by the context of the black box cell within the RTL design. After loading a user grey cell for each of the black box cells used in the user design, the EDA software tool may perform timing analysis of the design in RTL.

Figure 7:
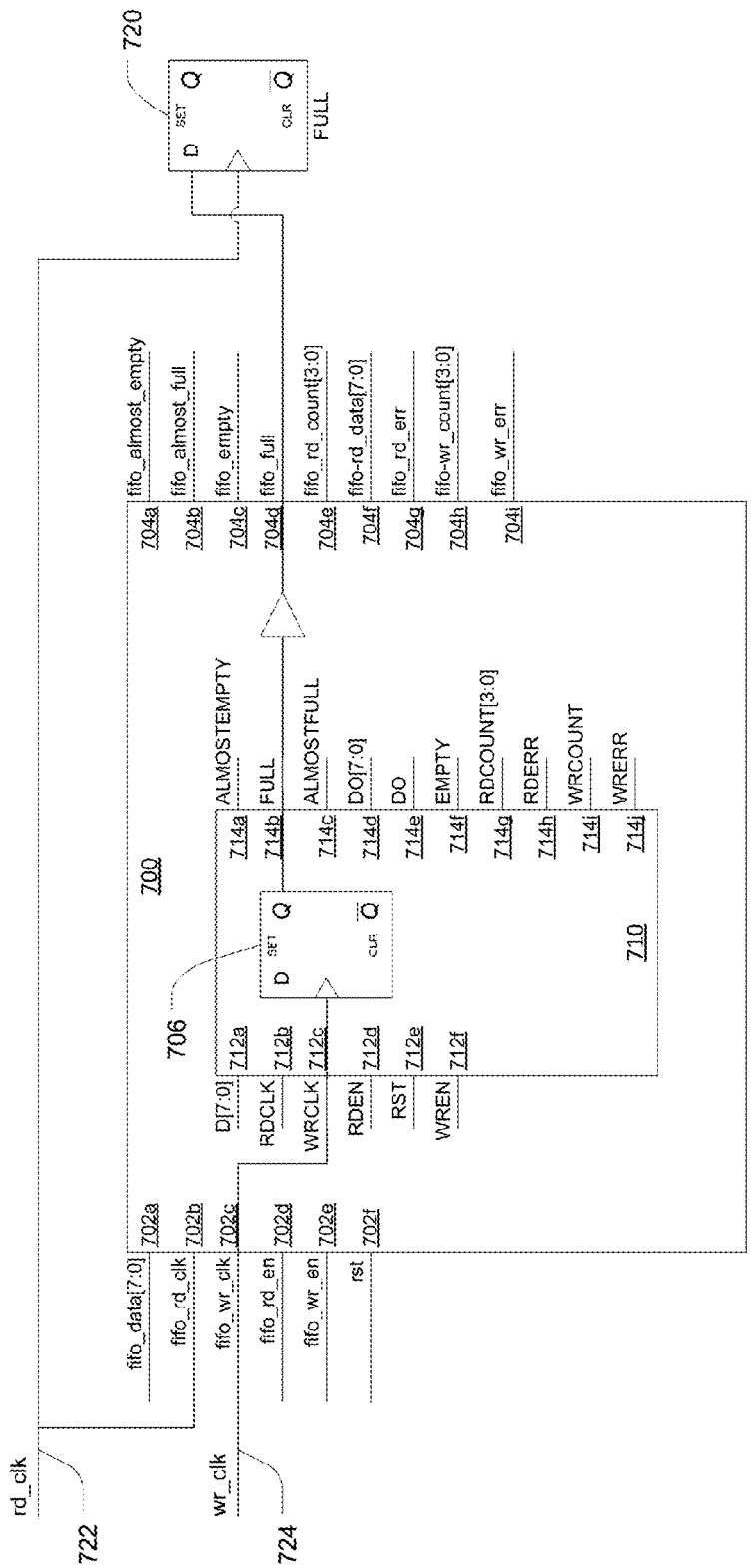
FIG. 7 illustrates an example of CDC analysis using a user grey cell, where a connectivity error has been found.

FIG. 7 illustrates an example of CDC analysis using a user grey cell, where a connectivity error has been found. In the illustrated example, the user design instantiates a vendor-provided FIFO 700. The vendor provided FIFO 700 comprises a plurality of input pins 702a-702f and output pins 704a-704i. The instantiation of the vendor-provided FIFO 700 has an output pin called fifo_full 704d, which is connected in the user design to a flop 720 to indicate elsewhere in the design that the FIFO 700 is full. The full flop 720 is clocked by the rd_clk 722. The relevant clock domain of the full flop 720 thus appears to be that of the rd_clk 722.

The vendor-provided FIFO 700 also comprises a black box cell, here replaced with a user grey cell 710 for purposes of CDC analysis. The user grey cell 710 comprises a plurality of input pins 712a-712f and output pins 714a-714j, which are of the same number and size as that of the black box cell that the user grey cell 710 replaces. The EDA tool has recognized that the user design uses at least the FULL 714b output of the black box cell, and therefore has inserted a user grey cell 710 that models the FULL 714b output pin. It is understood that the user grey cell 710 may model other input and output pins as necessary for CDC analysis. The FULL 714b output pin is clocked by the WRCLK 712c clock input of the user grey cell 710. The user grey cell 710 thus comprises a DFF 706 where the DFF's output is connected to the FULL 714b output pin of the user grey cell 710 and the clock input is connected to the WRCLK 712c. The WRCLK 712c input is driven by the fifo_wr_clk 702c input of the user-instantiated FIFO 700, which itself is connected to a clock signal wr_clk 724. The user grey cell's 710 DFF 706 is therefore in the clock domain of the wr_clk 724.

CDC analysis using the user grey cell 710 reveals a clock domain crossing violation. The DFF 706 of the user grey cell 710 is clocked by the wr_clk 724 by way of the fifo_wr_clk 702c pin of the FIFO 700 instance and the WRCLK 712c pin of the user grey cell 710. The DFF's 706 output is connected to the full flop 720 by way of the FULL 714b output of the user grey cell 710 and the fifo_full 704d output of the FIFO 700 instance. The full flop 720, however, is clocked by the rd_clk 722. Because the rd_clk 722 and the wr_clk 724 are not synchronized, the full flop 720 is likely to suffer from metastability, which can cause incorrect values to propagate to other parts of the design. The user is alerted to this error, and will recognize that the full flop 720 should have been connected to the wr_clk 724.

Figure 8:
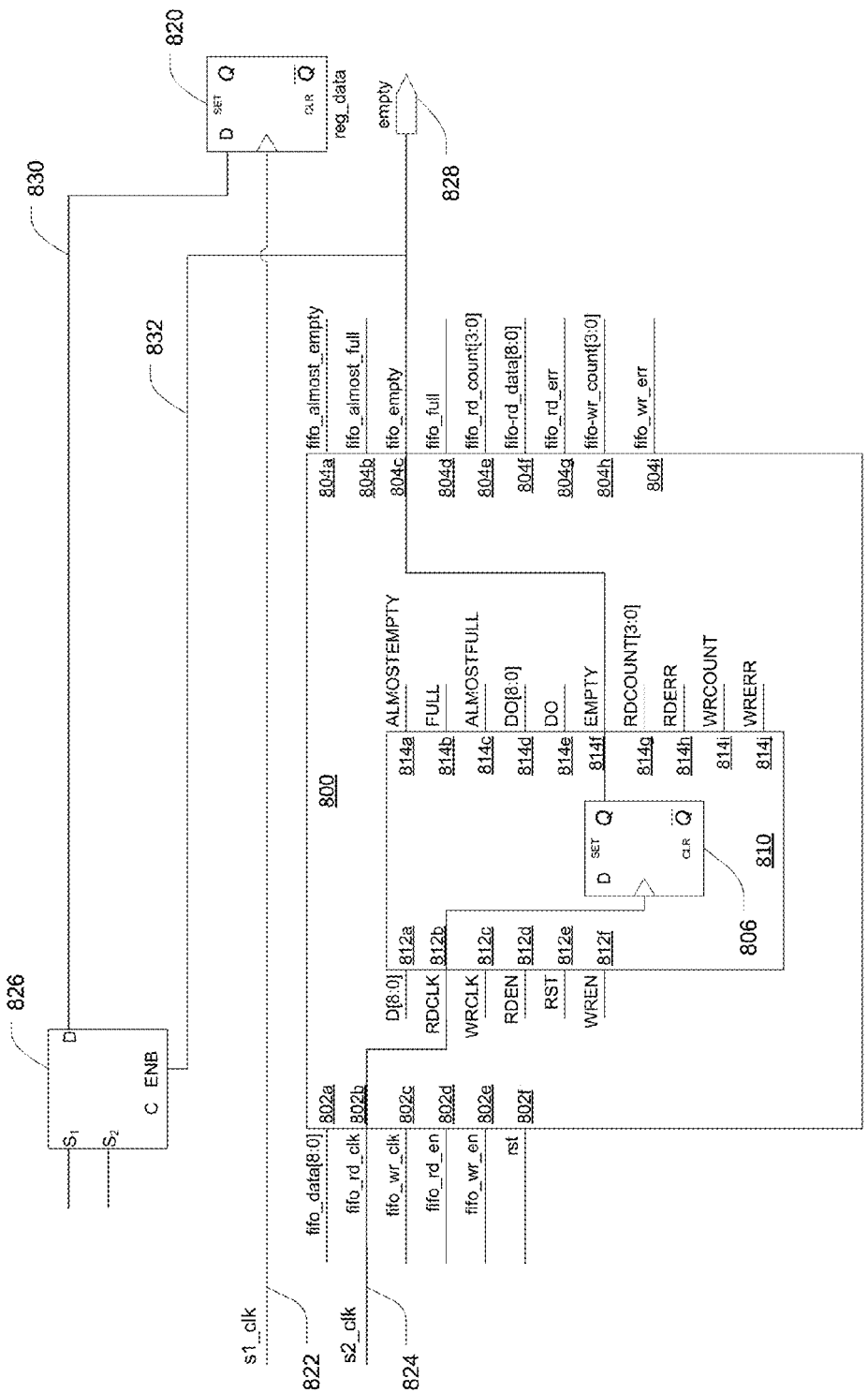
FIG. 8 illustrates an additional example of CDC analysis using a user grey cell, where a synchronization error has been found.

FIG. 8 illustrates an additional example of CDC analysis using a user grey cell, where a synchronization error has been found. In the illustrated example, the user design instantiates a vendor-provided FIFO 800. The vendor-provided FIFO 800 comprises a plurality of input pins 802a-802f and output pins 804a-804i. The instantiation of the vendor-provided FIFO 800 has an output pin called fifo_empty 804c, which is connected in the user design to both a port 828 and the enable signal of a multiplexer (MUX) 826. The output of the MUX 826 is connected to the D input of an external flop 820, where the external flop's 820 clock input is connected to a clock s1_clk 822. The relevant clock domain of the external flop 820 thus appears to be that of the s1_clk 822 clock.

The vendor provided FIFO 800 also comprises a black box cell, here replaced with a user grey cell 810 for purposes of CDC analysis. The user grey cell 810 comprises a plurality of input pins 812a-812f and output pins 814a-814j, which are of the same number and size as that of the black box cell that the user grey cell 810 replaces. The EDA tool has recognized that the user design uses at least the EMPTY output of the black box cell, and therefore has inserted a user grey cell 810 that models the EMPTY 814f output pin. It is understood that the user grey cell 810 may model other input and output pins as necessary for CDC analysis. The EMPTY 814f output pin is clocked by the RDCLK 812b input of the user grey cell 810. The user grey cell 810 thus comprises a DFF 806 where the DFF's 806 output is connected to the EMPTY 814f output pin of the user grey cell 810 and the clock input is connected to the RDCLK 812b. The RDCLK 812b input is driven by the fifo_rd_clk 802b input of the user-instantiated FIFO 800, which itself is connected to a clock signal s2_clk 824. The user grey cell's 801 DFF 806 is therefore in the clock domain of the s2_clk 824.

CDC analysis using the user grey cell 810 reveals a clock domain crossing violation. The DFF 806 of the user grey cell 810 is clocked by the s2_clk 824 by way of the fifo_rd_clk 802b pin of the FIFO 800 instance and the RDCLK 812b pin of the user grey cell 810. The DFF's 806 output indirectly drives the external flop 820 through combinational logic (that is, the external MUX 826). The external flop 820, however, is clocked by the s1_clk 822. Because the s1_clk 822 and the s2_clk 824 are not synchronized, the external flop 820 is likely to suffer from metastability, which can cause incorrect values to propagate to other parts of the design. The user is alerted to this error, and will recognize that a synchronizer needs to be inserted to synchronize the s1_clk 822 and the s2_clk 824.

Figure 9:
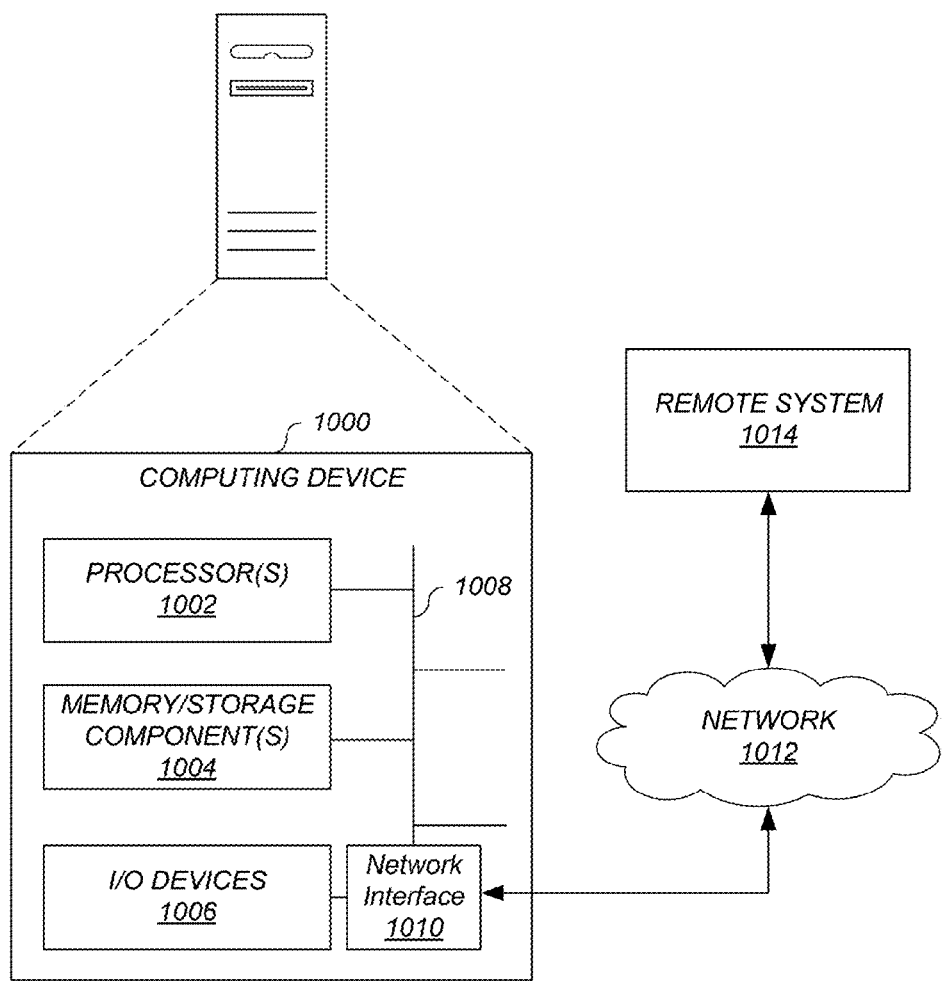
FIG. 9 illustrates one embodiment of a computing device which can be used in one embodiment of the system and method for user grey cell analysis.

FIG. 9 illustrates one embodiment of a computing device 1000 which can be used in one embodiment of the system and method for user grey cell generation. For the sake of clarity, the computing device 1000 is shown and described here in the context of a single computing device. It is to be appreciated and understood, however, that any number of suitably configured computing devices can be used to implement any of the described embodiments. For example, in at least some implementation, multiple communicatively linked computing devices are used. One or more of these devices can be communicatively linked in any suitable way such as via one or more networks (LANs), one or more wide area networks (WANs) or any combination thereof.

In this example, the computing device 1000 comprises one or more processor circuits or processing units 1002, on or more memory circuits and/or storage circuit component(s) 1004 and one or more input/output (I/O) circuit devices 1006. Additionally, the computing device 1000 comprises a bus 1008 that allows the various circuit components and devices to communicate with one another. The bus 1008 represents one or more of any of several types of bus structures, including a memory bus or local bus using any of a variety of bus architectures. The bus 1008 may comprise wired and/or wireless buses.

The processing unit 1002 may be responsible for executing various software programs such as system programs, applications programs, and/or module to provide computing and processing operations for the computing device 1000. The processing unit 1002 may be responsible for performing various voice and data communications operations for the computing device 1000 such as transmitting and receiving voice and data information over one or more wired or wireless communication channels. Although the processing unit 1002 of the computing device 1000 includes single processor architecture as shown, it may be appreciated that the computing device 1000 may use any suitable processor architecture and/or any suitable number of processors in accordance with the described embodiments. In one embodiment, the processing unit 1002 may be implemented using a single integrated processor.

The processing unit 1002 may be implemented as a host central processing unit (CPU) using any suitable processor circuit or logic device (circuit), such as a as a general purpose processor. The processing unit 1002 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1002 may be coupled to the memory and/or storage component(s) 1004 through the bus 1008. The bus 1008 may comprise any suitable interface and/or bus architecture for allowing the processing unit 1002 to access the memory and/or storage component(s) 1004. Although the memory and/or storage component(s) 1004 may be shown as being separate from the processing unit 1002 for purposes of illustration, it is worthy to note that in various embodiments some portion or the entire memory and/or storage component(s) 1004 may be included on the same integrated circuit as the processing unit 1002. Alternatively, some portion or the entire memory and/or storage component(s) 1004 may be disposed on an integrated circuit or other medium (e.g., hard disk drive) external to the integrated circuit of the processing unit 1002. In various embodiments, the computing device 1000 may comprise an expansion slot to support a multimedia and/or memory card, for example.

The memory and/or storage component(s) 1004 represent one or more computer-readable media. The memory and/or storage component(s) 1004 may be implemented using any computer-readable media capable of storing data such as volatile or non-volatile memory, removable or non-removable memory, erasable or non-erasable memory, writeable or re-writeable memory, and so forth. The memory and/or storage component(s) 1004 may comprise volatile media (e.g., random access memory (RAM)) and/or nonvolatile media (e.g., read only memory (ROM), Flash memory, optical disks, magnetic disks and the like). The memory and/or storage component(s) 1004 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1006 allow a user to enter commands and information to the computing device 1000, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 1000 may comprise an alphanumeric keypad coupled to the processing unit 1002. The keypad may comprise, for example, a QWERTY key layout and an integrated number dial pad. The computing device 1000 may comprise a display coupled to the processing unit 1002. The display may comprise any suitable visual interface for displaying content to a user of the computing device 1000. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1002 may be arranged to provide processing or computing resources to the computing device 1000. For example, the processing unit 1002 may be responsible for executing various software programs including system programs such as operating system (OS) and application programs. System programs generally may assist in the running of the computing device 1000 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 1000 may comprise other system programs such as device drivers, programming tools, utility programs, software libraries, application programming interfaces (APIs), and so forth.

The computer 1000 also includes a network interface 1010 coupled to the bus 1008. The network interface 1010 provides a two-way data communication coupling to a local network 1012. For example, the network interface 1010 may be a digital subscriber line (DSL) modem, satellite dish, an integrated services digital network (ISDN) card or other data communication connection to a corresponding type of telephone line. As another example, the network interface 1010 may be a local area network (LAN) card effecting a data communication connection to a compatible LAN. Wireless communication means such as internal or external wireless modems may also be implemented.

In any such implementation, the network interface 1010 sends and receives electrical, electromagnetic or optical signals that carry digital data streams representing various types of information, such as the selection of goods to be purchased, the information for payment of the purchase, or the address for delivery of the goods. The network interface 1010 typically provides data communication through one or more networks to other data devices and remote systems 1014. For example, the network interface 1010 may effect a connection through the local network to an Internet Host Provider (ISP) or to data equipment operated by an ISP. The ISP in turn provides data communication services through the internet (or other packet-based wide area network) to remote systems 1014. The local network and the internet both use electrical, electromagnetic or optical signals that carry digital data streams. The signals through the various networks and the signals on the network interface 1010, which carry the digital data to and from the computer system 1000, are exemplary forms of carrier waves transporting the information.

The computing device 1000 can send messages and receive data, including program code, through the network(s) and the network interface 1010. In the Internet example, a server might transmit a requested code for an application program through the internet, the ISP, the local network (the network 1012) and the network interface 1010. The received code may be executed by processing unit 1002 as it is received, and/or stored in storage device 1004, or other non-volatile storage for later execution. In this manner, computing device 1000 may obtain application code in the form of a carrier wave.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it was individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

Various aspects of the subject matter described herein are set out in the following numbered clauses:

1. A computing device comprising: a processor; and a non-transitory computer-readable medium coupled to the processor, the non-transitory computer-readable medium configured to store computer program instructions that when executed by the processor are operable to cause the processor to: select a black box cell for inclusion in a digital hardware design, wherein the black box cell comprises one or more pins; identify a subset of the one or more pins of the black box cell used by the digital hardware design; and generate a user grey cell for the black box cell, wherein the user grey cell comprises a simplified logic implementation of the digital hardware design for each of the subset of pins used by the digital hardware design.

2. The computing device of clause 1, comprising defining, by the processor, a subset of input pins comprising at least one of the one or more pins, wherein each of the subset of input pins comprises an associated clock pin.

3. The computing device of any one of clauses 1 to 2, comprising generating, by the processor, a plurality of D flip-flops wherein a D flip-flop is coupled to each of the subset of input pins, wherein for each D flip-flop a D input of the D flip-flop is coupled to the associated input pin and wherein the clock input of the D flip-flop is coupled to the clock pin associated with the input pin.

4. The computing device of any one of clauses 1 to 3, comprising defining, by the processor, one of a reset pin, a set pin, or both a reset pin and a set pin, for at least one of the one or more input pins, and wherein at least one D flip-flop for the at least one of one or more input pins comprises a D flip-flop with a reset and set input.

5. The computing device of any one of clauses 1 to 4, comprising defining, by the processor, a subset of output pins comprising at least one of the one or more pins, wherein each of the subset of output pins comprises an associated clock pin, wherein the associated clock pin comprises one of an input pin or an output pin.

6. The computing device of any one of clauses 1 to 5, comprising generating, by the processor, a plurality of D flip-flops wherein a D flip-flop is coupled to each of the subset of output pins, wherein for each D flip-flop the output of the D flip-flop is coupled to the associated output pin, and wherein the clock input of the D flip-flop is coupled to the clock pin associated with the output pin.

7. The computing device of any one of clauses 1 to 6, comprising defining, by the processor, one of a reset pin, a set pin, or both a reset pin and a set pin, for at least one of the subset of output pins, and wherein at least one D flip-flop for the at least one of the subset of output pins comprises a D flip-flop with a reset and a set input.

8. The computing device of any one of clauses 1 to 7, comprising defining, by the processor, a plurality of circuit elements in accordance with an equation, wherein the equation is defined by the following relationship:

```
<expression> := <term>                    //precedence 1
              | <expression> "+" <term>
              | <expression> "|" <term>
<term> := <factor1> |                     //precedence 2
          <term> "&" <factor1>
          <term> "^" <factor1>
          <term> " " <factor1>
<factor1> := "!" <factor> |               //precedence 3
             <factor>
<factor> := <constant> |
            <variable> |
            "(" <expression> ")"
<variable) := <inv_variable> | id
<inv_variable> := "'" id |
                  "id'"
<constant> := <digit>
<digit> := <digit> 0, 1...n
<id> := <alpha>,<digit>
<alpha> := a-z | A-Z, <alpha>
```

9. The computing device of any one of clauses 1 to 8, wherein the simplified logic for at least one of the subset of input pins is defined by the equation.

10. The computing device of any one of clauses 1 to 8, wherein the simplified logic for at least one of the subset of output pins is defined by the equation.

11. A computing device comprising: a processor; and a non-transitory computer-readable medium coupled to the processor, the non-transitory computer-readable medium configured to store computer program instructions that when executed by the processor are operable to cause the processor to: identify one or more black box cells in a digital hardware design, wherein each black box cell comprises one or more pins; determine a subset of the one or more pins of each black box cell used by the digital hardware design; and select a user grey cell for each black box cell, wherein each user grey cell comprises a simplified logic implementation for each of the subset of pins.

12. The computing device of clause 11, wherein the processor is further operable to identify a subset of input pins comprising input pins used in the digital hardware design, wherein each of the subset of input pins comprises an associated clock pin.

13. The computing device of any one of clauses 11 to 12, wherein the processor is further operable to select a user grey cell comprising a plurality of D flip-flops wherein each D flip-flops is coupled to each of the subset of input pins, wherein for each D flip-flop a D input of the D flip-flop is coupled to the associated input pin and wherein the clock input of the D flip-flop is coupled to the clock pin associated with the input pin.

14. The computing device of any one of clauses 11 to 13, wherein the processor is further operable to select a user grey cell comprising one of a reset pin, a set pin, or both a reset pin and a set pin for at least one of the subset of input pins, and wherein at least one D flip-flop for the at least one of the subset of input pins comprises a D flip-flop with a reset and set input.

15. The computing device of any one of clauses 11 to 14, wherein the processor is further operable to identify a subset of output pins comprising output pins used in the digital hardware design, wherein each of the subset of output pins comprises an associated clock pin, wherein the associated clock pin comprises one of an input pin or an output pin.

16. The computing device of any one of clauses 11 to 15, wherein the processor is further operable to select a user grey cell comprising a plurality of D flip-flops wherein a D flip-flop is coupled to each of the subset of output pins, wherein for each D flip-flop the output of the D flip-flop is coupled to the associated output pin, and wherein the clock input of the D flip-flop is coupled to the clock pin associated with the output pin.

17. The computing device of any one of clauses 11 to 16, wherein the processor is further operable to select a user grey cell comprising one of a reset pin, a set pin, or both a reset pin and a set pin for at least one of the subset of output pins, and wherein at least one D flip-flop for the at least one of the subset of output pins comprises a D flip-flop with a reset and a set input.

18. The computing device of any one of clauses 11 to 17, wherein the processor is further operable to select a user grey cell comprising a plurality of circuit elements according to an equation, wherein the equation is defined according to the following relationship:

```
<expression> := <term>                    //precedence 1
              | <expression> "+" <term>
              | <expression> "|" <term>
<term> := <factor1> |                     //precedence 2
          <term> "&" <factor1>
          <term> "^" <factor1>
          <term> " " <factor1>
<factor1> := "!" <factor> |               //precedence 3
             <factor>
<factor> := <constant> |
            <variable> |
            "(" <expression> ")"
<variable) := <inv_variable> | id
<inv_variable> := "'" id |
                  "id'"
<constant> := <digit>
<digit> := <digit> 0, 1...n
<id> := <alpha>,<digit>
<alpha> := a-z | A-Z, <alpha>.
```

19. The computing device of any one of clauses 11 to 18, wherein the simplified logic for at least one of the subset of input pins is defined by the equation.

20 The computing device of any one of clauses 11 to 18, wherein the simplified logic for at least one of the subset of output pins is defined by the equation.

21. A computer-implemented method for generating a user grey cell according to any one of clauses 1 to 10 substantially as disclosed and described.

22. A computer-implemented method according to any one of clauses 11 to 20 substantially as disclosed and described.

What is claimed is:

1. A computing device comprising:
   a processor; and
   a non-transitory computer-readable medium coupled to the processor, the non-transitory computer-readable medium configured to store computer program instructions that when executed by the processor are operable to cause the processor to:
   select a black box cell for inclusion in a digital hardware design, wherein the black box cell comprises one or more pins and wherein the black box cell comprises at least one of an input or an output and at least one clock domain that is unknown to an electronic design automation tool;
   identify a subset of the one or more pins of the black box cell used by the digital hardware design;
   generate a user grey cell for modeling the black box cell according to a non-RTL and Extensible Markup Language (XML) format, wherein the user grey cell comprises a simplified logic implementation of the digital hardware design for each of the subset of pins used by the digital hardware design, wherein the simplified logic implementation comprises the at least one clock domain of the black box cell modeled based on the at least one of the input or the output of the black box cell;
   provide a display of clock domains of the black box cell to allow for an analysis of whether the clock domains are synchronized;
   define a subset of input pins comprising at least one of the subset of one or more pins, wherein each of the subset of input pins comprises an associated clock pin;
   define a first subset of output pins comprising at least one of the subset of one or more pins, wherein the first subset of output pins comprises a first clock pin, wherein the first clock pin comprises one of an input pin or an output pin, and wherein the first clock pin is associated with a first clock domain;
   define a second subset of output pins comprising at least one of the one or more pins, wherein the second subset of output pins comprises a second clock pin, wherein the second clock pin comprises one of an input pin or an output pin, and wherein the second clock pin is associated with a second clock domain;
   analyze whether the first clock domain of the black box cell is synchronized with the second clock domain of the black box cell; and
   provide an error indication when the first clock domain of the black box cell is not synchronized with the second clock domain of the black box cell;
   wherein the first clock domain is different from the second clock domain; and
   wherein the first clock domain and the second clock domain of the black box cell are represented with associated circuit elements of each clock domain coupled to each of the clock domains;
   wherein the simplified logic implementation comprises input logic to show that a plurality of the subset of one or more pins are within at least one clock domain of the black box cell.

2. The computing device of claim 1, comprising generating, by the processor, a plurality of D flip-flops wherein a D flip-flop is coupled to each of the subset of input pins, wherein for each D flip-flop a D input of the D flip-flop is coupled to the associated input pin and wherein the clock input of the D flip-flop is coupled to the clock pin associated with the input pin.

3. The computing device of claim 2, comprising defining, by the processor, one of a reset pin, a set pin, or both a reset pin and a set pin, for at least one of the one or more input pins, and wherein at least one D flip-flop for the at least one of one or more input pins comprises a D flip-flop with a reset and set input.

4. The computing device of claim 1, wherein the first clock pin comprises one of an input pin or an output pin, and generating, by the processor, a plurality of D flip-flops wherein a D flip-flop is coupled to each of the first subset of output pins, wherein for each D flip-flop the output of the D flip-flop is coupled to a first output pin of the first subset of output pins, and wherein the clock input of the D flip-flop is coupled to a clock pin associated with the first output pin.

5. The computing device of claim 4, comprising defining, by the processor, one of a reset pin, a set pin, or both a reset pin and a set pin, for at least one of the first subset of output pins, and wherein at least one D flip-flop comprises a D flip-flop with a reset and a set input.

6. A computing device comprising:
   a processor; and
   a non-transitory computer-readable medium coupled to the processor, the non-transitory computer-readable medium configured to store computer program instructions that when executed by the processor are operable to cause the processor to:
   identify one or more black box cells in a digital hardware design, wherein each black box cell comprises one or more pins and wherein the black box cell comprises at least one of an input or an output and at least one clock domain that is unknown to an electronic design automation tool;
   determine a subset of the one or more pins of each black box cell used by the digital hardware design;
   select a user grey cell for modeling each black box cell, wherein the user grey cell comprises a non-RTL format and Extensible Markup Language (XML), wherein the user grey cell comprises a simplified logic implementation for each of the subset of pins, and wherein the simplified logic implementation comprises the at least one clock domain of the black box cell modeled based on the at least one of the input or the output of the black box cell; and
   provide a display of all clock domains of the black box cell to allow for an analysis of whether the clock domains are synchronized;
   wherein all of the clock domains of the black box cell are represented with associated circuit elements of each clock domain coupled to each of the clock domains.

7. The computing device of claim 6, wherein the processor is further operable to identify a subset of input pins comprising input pins used in the digital hardware design, wherein each of the subset of input pins comprises an associated clock pin.

8. The computing device of claim 7, wherein the processor is further operable to select a user grey cell comprising a plurality of D flip-flops wherein each D flip-flop is coupled to each of the subset of input pins, wherein for each D flip-flop a D input of the D flip-flop is coupled to the associated input pin and wherein the clock input of the D flip-flop is coupled to the clock pin associated with the input pin.

9. The computing device of claim 8, wherein the processor is further operable to select a user grey cell comprising one of a reset pin, a set pin, or both a reset pin and a set pin for at least one of the subset of input pins, and wherein at least one D flip-flop for the at least one of the subset of input pins comprises a D flip-flop with a reset and set input.

10. The computing device of claim 6, wherein the processor is further operable to identify a subset of output pins comprising output pins used in the digital hardware design, wherein each of the subset of output pins comprises an associated clock pin, wherein the associated clock pin comprises an output pin, the associated clock pin comprises the at least one clock domain.

11. The computing device of claim 10, wherein the processor is further operable to select a user grey cell comprising a plurality of D flip-flops wherein a D flip-flop is coupled to each of the subset of output pins, wherein for each D flip-flop the output of the D flip-flop is coupled to the associated output pin, and wherein the clock input of the D flip-flop is coupled to the clock pin associated with the output pin.

12. The computing device of claim 11, wherein the processor is further operable to select a user grey cell comprising one of a reset pin, a set pin, or both a reset pin and a set pin for at least one of the subset of output pins, and wherein at least one D flip-flop for the at least one of the subset of output pins comprises a D flip-flop with a reset and a set input.

13. The computing device of claim 6, wherein the computer program instructions, when executed by the processor, are further operable to cause the processor to analyze whether the at least one clock domain of the black box cell is synchronized with at least one additional clock domain of the black box cell.

14. The computing device of claim 13, wherein the computer program instructions, when executed by the processor, are further operable to cause the processor to provide an error indication when the at least one clock domain of the black box cell is not synchronized with at least one additional clock domain of the black box cell.

15. The computing device of claim 6, wherein the at least one clock domain comprises a first clock domain and a second clock domain, and wherein the at least one of the input of the black box cell comprises the first clock domain and wherein the output of the black box cell comprises the second clock domain of the black box cell.

16. The computing device of claim 6, wherein the simplified logic implementation comprises input logic to show that a plurality of the subset of pins are within the at least one clock domain of the black box cell.

17. The computing device of claim 6, comprising defining, by the processor, a first subset of output pins comprising at least one of the one or more pins, wherein the first subset of output pins comprises a first clock pin, wherein the first clock pin comprises one of an input pin or an output pin, and wherein the first clock pin is associated with a first clock domain, and defining, by the processor, a second subset of output pins comprising at least one of the one or more pins, wherein the second subset of output pins comprises a second clock pin, wherein the second clock pin comprises one of an input pin or an output pin, and wherein the second clock pin is associated with a second clock domain.

18. The computing device of claim 6, wherein the black box cell is a first black box cell and the user grey cell is a first user grey cell, wherein the computer program instructions, when executed by the processor, are further operable to:

cause the processor to select a second black box cell for inclusion in a digital hardware design, wherein the second black box cell comprises one or more pins and wherein the second black box cell comprises at least one of an input or an output and at least one clock domain that is unknown to the electronic design automation tool;

identify a subset of the one or more pins of the second black box cell used by the digital hardware design;

generate a second user grey cell for modeling the black box cell according to a non-RTL and Extensible Markup Language (XML) format; and couple the first user grey cell and the second user grey cell according to a user design;

wherein the first user grey cell model and the second user grey cell model comprises information to perform clock domain crossing analysis, false path analysis, and multi-cycle path analysis of the user design.

19. The computing device of claim 18, wherein the black box cell is a first black box cell and the user grey cell is a first user grey cell, wherein the computer program instructions, when executed by the processor, are further operable to couple the first user grey cell and the second user grey cell through a plurality of circuit elements according to the user design.

20. The computing device of claim 19, wherein the second user grey cell models only one or more input ports that are in use by the user design and wherein the second user grey models a number of input ports that are less than a number of input ports of the second black box cell.

21. A computer-implemented method for generating a user grey cell, the method comprising:

selecting, by a processor, a black box cell for inclusion in a digital hardware design, wherein the black box cell comprises one or more pins and wherein the black box cell comprises at least one of an input or an output and at least one clock domain that is unknown to an electronic design automation tool;

identifying, by the processor, a subset of the one or more pins of the black box cell used by the digital hardware design;

generating, by the processor, a user grey cell for modeling the black box cell according to a non-RTL and Extensible Markup Language (XML) format, wherein the user grey cell comprises a simplified logic implementation of the digital hardware design for each of the subset of pins used by the digital hardware design, wherein the simplified logic implementation comprises the at least one clock domain of the black box cell modeled based on the at least one of the input or the output of the black box cell;

providing, by the processor, a display of clock domains of the black box cell to allow for an analysis of whether the clock domains are synchronized;

defining a subset of input pins comprising at least one of the subset of one or more pins, wherein each of the subset of input pins comprises an associated clock pin;

defining, by the processor, a first subset of output pins comprising at least one of the subset of one or more pins, wherein the first subset of output pins comprises a first clock pin, wherein the first clock pin comprises one of an input pin or an output pin, and wherein the first clock pin is associated with a first clock domain;

defining, by the processor, a second subset of output pins comprising at least one of the one or more pins, wherein the second subset of output pins comprises a second clock pin, wherein the second clock pin comprises one of an input pin or an output pin, and wherein the second clock pin is associated with a second clock domain;

analyzing, by the processor, whether the first clock domain of the black box cell is synchronized with the second clock domain of the black box cell; and providing, by the processor, an error indication when the first clock domain of the black box cell is not synchronized with the second clock domain of the black box cell;

wherein the first clock domain is different from the second clock domain; and wherein the first clock domain and the second clock domain of the black box cell are represented with associated circuit elements of each clock domain coupled to each of the clock domains;

wherein the simplified logic implementation comprises input logic to show that a plurality of the subset of one or more pins are within at least one clock domain of the black box cell.

22. A computer-implemented method, the method comprising:

identifying, by a processor, one or more black box cells in a digital hardware design, wherein each black box cell comprises one or more pins and wherein the black box cell comprises at least one of an input or an output and at least one clock domain that is unknown to an electronic design automation tool;

determining, by the processor, a subset of the one or more pins of each black box cell used by the digital hardware design;

selecting, by the processor, a user grey cell for modeling each black box cell, wherein the user grey cell comprises a non-RTL format and Extensible Markup Language (XML), wherein the user grey cell comprises a simplified logic implementation for each of the subset of pins, and wherein the simplified logic implementation comprises the at least one clock domain of the black box cell modeled based on the at least one of the input or the output of the black box cell; and providing, by the processor, a display of all clock domains of the black box cell to allow for an analysis of whether the clock domains are synchronized;

wherein all of the clock domains of the black box cell are represented with associated circuit elements of each clock domain coupled to each of the clock domains.

* * * * *

UNITED STATES PATENT AND TRADEMARK OFFICE
CERTIFICATE OF CORRECTION

PATENT NO. : 9,798,845 B2
APPLICATION NO. : 14/478452
DATED : October 24, 2017
INVENTOR(S) : David E. Wallace and Scott Aron Bloom It is certified that error appears in the above-identified patent and that said Letters Patent is hereby corrected as shown below:

In the Specification

In Column 8, Line 19, delete "information may be utilized the EDA software tool to infer" and insert -- information may be utilized by the EDA software tool to infer --, therefor.

In Column 10, Line 51, delete "cycle paths that being or end at the user grey cell 420." and insert -- cycle paths that begin or end at the user grey cell 420. --, therefor.

In Column 11, Line 52, delete "block-box cell" and insert -- black box cell --, therefor.

In Column 15, Line 28, delete "such as a as a general" and insert -- such as a general --, therefor.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*